(12) United States Patent
Tiedemann, Jr. et al.

(10) Patent No.: US 7,505,437 B2
(45) Date of Patent: Mar. 17, 2009

(54) METHOD AND APPARATUS FOR ENABLING SUBSCRIBER STATIONS TO PROCESS A SYNCHRONIZATION CHANNEL IN A SPREAD SPECTRUM COMMUNICATIONS SYSTEM

(75) Inventors: Edward G. Tiedemann, Jr., Concord, MA (US); Jun Wang, San Diego, CA (US); Ragulan Sinnarajah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 10/085,608

(22) Filed: Feb. 26, 2002

(65) Prior Publication Data
US 2003/0161283 A1    Aug. 28, 2003

(51) Int. Cl.
*H04B 7/216* (2006.01)
(52) U.S. Cl. ............ 370/335; 370/465; 455/552.1
(58) Field of Classification Search ........... 370/310, 370/320, 326, 331, 335, 341, 342, 465, 350; 455/442, 524, 525, 552
See application file for complete search history.

(56) References Cited

U.S. PATENT DOCUMENTS

| | | | |
|---|---|---|---|
| 4,901,307 A | 2/1990 | Gilhousen et al. | 370/320 |
| 5,103,459 A | 4/1992 | Gilhousen et al. | 370/206 |
| 5,504,773 A | 4/1996 | Padovani et al. | 375/130 |
| 6,198,937 B1* | 3/2001 | DeClerck et al. | 455/517 |
| 6,567,666 B2* | 5/2003 | Czaja et al. | 455/442 |
| 6,594,242 B1* | 7/2003 | Kransmo | 370/331 |
| 6,741,868 B1* | 5/2004 | Park et al. | 455/552.1 |
| 2002/0085523 A1 | 7/2002 | Kim | |
| 2002/0159416 A1* | 10/2002 | Kazmi et al. | 370/335 |

FOREIGN PATENT DOCUMENTS

| | | |
|---|---|---|
| EP | 1006746 | 6/2000 |
| EP | 1 073 296 A2 | 1/2001 |

OTHER PUBLICATIONS

Dzung, D., "Link Control In Terrestrial/Satellite Mobile Communication Systems," *Mobile Radio and Personal Communications International Conference*, XP000198208, 77-82, 1991.

(Continued)

*Primary Examiner*—Wing F Chan
*Assistant Examiner*—Saba Tsegaye
(74) *Attorney, Agent, or Firm*—Pavel Kalousek; Alan C. Gordon; Thomas R. Rouse

(57) ABSTRACT

During initiation procedure between subscriber stations and access network adhering to CDMA standards, (e.g., IS-95 and IS-2000) the subscriber station receives a Sync Channel Message. Due to a design/manufacturing error, certain subscriber stations adhering to the IS-95 fail to ignore a portion of the Sync Channel Message, intended for a proper operation of subscriber stations adhering to the IS-2000. This causes a failure of the IS-95 subscriber stations' operation. The disclosed invention describes embodiments allowing the faulty subscriber stations to operate on an access networks build in accordance with both IS-95 and IS-2000 standards.

10 Claims, 2 Drawing Sheets

OTHER PUBLICATIONS

3G TS 25.211 V3.2.0 (2000-03) 3rd Generation Partnership Project; Technical Specification Group Radio Access Network; Physical channels and mapping of transport channels onto physical channels (FDD) (Release 1999).

3G TS 25.212 V3.2.0 (2000-03) 3rd Generation Partnership Project; Technical Specification Group Radio Access Network; Multiplexing and channel coding (FDD) (Release 1999).

3G TS 25.213 V3.2.0 (2000-03) 3rd Generation Partnership Project; Technical Specification Group Radio Access Network; Spreading and modulation (FDD) (Release 1999).

3G TS 25.214 V3.2.0 (2000-03) 3rd Generation Partnership Project; Technical Specification Group Radio Access Network; Physical layer procedures (FDD) (Release 1999).

International Search Report—PCT/US03/005317, International Search Authority—European Patent Office, Jun. 13, 2003.

* cited by examiner

METHOD AND APPARATUS FOR ENABLING SUBSCRIBER STATIONS TO PROCESS A SYNCHRONIZATION CHANNEL IN A SPREAD SPECTRUM COMMUNICATIONS SYSTEM

BACKGROUND

1. Field

The present invention relates generally to communication systems, and more specifically to a method and an apparatus for enabling subscriber stations to process a synchronization channel in a communication system.

2. Description of Related Art

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent service of relatively short duration rather than continuous access to the common communication channel. Several multiple-access techniques are known in the art, such as time division multiple-access (TDMA) and frequency division multiple-access (FDMA). Another type of a multiple-access technique is a code division multiple-access (CDMA) spread spectrum system that conforms to the "TIA/EIA/IS-95 Subscriber station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one mobile subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

Each of the standards noted above defines a mechanism for initiating and processing a call between a subscriber station and a base station. The mechanism is characterized by a call processing state machine on the signaling layer (i.e., layer-3) that includes a number of states and a set of allowed transitions between the states. Each state in the state machine corresponds to a particular state of the subscriber station (or base station) with respect to the call being processed. A transition to a new state takes place upon the occurrence of certain specified events.

An example of a state machine 100, embodying a subscriber station call processing is shown in FIG. 1. A detailed description of the state machine is described in the applicable CDMA standards (e.g., the IS-95 and IS-2000 standards), the following description is for tutorial purposes only.

As shown in FIG. 1, upon power-up, the subscriber station transitions from a power-up state 110 to a subscriber station initialization state 112. In state 112, the subscriber station selects a particular system to use. If the selected system is an analog system, e.g., an Advanced Mobile Phone System (AMPS), the subscriber station transitions to a state 114 and begins analog mode operation. Otherwise, if the selected system is a CDMA system, the subscriber station reads a frequency (a primary frequency) from the subscriber station's memory, and attempts to acquire a pilot channel transmitted on the primary frequency by one or more base stations in the selected system. If the attempt is unsuccessful, the subscriber station reads another frequency (a secondary frequency) from the subscriber station's memory, and attempts to acquire the pilot channel transmitted on the secondary frequency. Therefore, the primary and the secondary frequencies may be, for the purposes of this document, referred to as system access frequencies. The Once the subscriber station has acquired the pilot channel, the subscriber station acquires a synchronization channel transmitted on the same frequency that provides the subscriber station with timing of the selected CDMA system. The synchronization channel further provides the subscriber station with messages, affecting further actions taken by the subscriber station. Among the messages, the subscriber station is provided with a Sync Channel Message. In addition to primary and secondary frequencies, there the phone can also contain a roaming list, with one or more frequencies. The roaming list may comprise the primary and secondary frequencies as well as additional frequencies. Roaming lists are known in the art, and are described in TIA/EIA/IS-683, "Over-the-Air Service Provisioning of Mobile Stations in Spread Spectrum Systems."

FIG. 2 illustrates an example of a Sync Channel Message 200 in accordance with the IS-2000 standard, which provides definitions and explanation of the fields comprising the message. The first portion 202 of the Sync Channel Message 200 comprises information intended for subscriber station operating in accordance with a revision 5 (P_REV 5) of the IS-95 standard. The subscriber stations operating in accordance with a revision 5 of the IS-95 standard (hereinafter P_REV 5 subscriber stations) read only fields of the first portion 202, and ignore the fields in the second portion 204 of the Sync Channel Message 200. The second portion 204 of the Sync Channel Message 200, comprises additional information intended for subscriber station operating in accordance with revisions 6 and 7 of the IS-2000 standard (hereinafter P_REV 6 and P_REV 7 subscriber stations).

Referring back to FIG. 1, the Sync Channel Message contains a field, (CDMA_FREQ for P_REV 5 subscriber stations and EXT_CDMA_FREQ for P_REV 6 and P_REV 7 subscriber stations) providing a subscriber station with a frequency, to which the subscriber station is to tune. The subscriber station tunes to the frequency specified by the appropriate field, and acquires a paging channel at the frequency. Upon acquiring the paging channel, the subscriber station registers with the sector. The paging channel further provides the subscriber station with messages, affecting further actions taken by the subscriber station. Among the messages, the subscriber station is provided with a message, (CDMA Channel List Message) which contains a list of frequencies to which the subscriber station is to tune. The subscriber station uses a hash function to select one of the frequencies, and tunes to the selected frequency. The subscriber station then acquires a paging channel transmitted at the selected frequency, and it enters a subscriber station idle state 116.

In state 116, the subscriber station monitors the paging channel on the forward link for messages from the base station. If the subscriber station is unable to receive the paging channel or if the mobile station moves to the coverage of another base station, the mobile station acquires the other base station and performs an idle handoff. In some cases, the subscriber station returns to state 112 while performing this idle handoff. In state 116, the subscriber station can receive messages or an incoming call, originate a call, perform registration, initiate a message transmission, or perform some other actions. Upon initiating any of these actions, the subscriber station transitions to a system access state 118.

In state 118, the subscriber station sends messages to the base station on one or more access channels and receives messages from the base station on the paging channel in an attempt to access the base station. The exchange of messages is dependent on the particular type of communication (e.g., voice, data) between the subscriber station and the base station and the originator of the message (i.e., the subscriber station or base station). Depending on the outcome of the message exchange, the subscriber station can return to idle state 116 if no communication on a traffic channel is to be performed with the base station or proceed to a subscriber station control on the traffic channel state 120 if a call with the base station is to be processed. Before the transition to state 120, the subscriber station is assigned a forward traffic channel for the call.

In state 120, the subscriber station communicates with the base station using the established forward and reverse traffic channels. Upon termination of the call, the subscriber station returns to state 112.

Due to a design/manufacturing error, certain P_REV 5 subscriber stations fail to ignore the second portion 204 of the Sync Channel Message 200 (of FIG. 2), which causes a failure of the P_REV 5 subscriber stations' operation. The problem can manifest itself in a communication system comprising sectors capable of supporting communication with subscriber stations operating in accordance with both IS-95 and IS-2000 standards. An exemplary frequency and channel assignment for such a sector is illustrated in Table I. One skilled in the art understands that all illustrations of frequency and channel assignment for a sector are for tutorial purposes only, and can be modified to suit a particular implementation of a communication system.

TABLE 1

| FREQUENCY | CHANNEL |
|---|---|
| f1 | Synchronization channel (F-SYNC) |
|    | Paging channel (F-PCH) |
| f2 | Paging channel (F-PCH) |
| f3 | Broadcast Control Channel (F-BCCH) |
|    | Common Control Channel (F-CCCH) |
| f4 | Broadcast Control Channel (F-BCCH) |
|    | Common Control Channel (F-CCCH) |

The sector transmits a Synchronization Channel (F-SYNC) and a Paging Channel (F-PCH) on the forward link on the primary frequency $f_1$. For the sake of simplicity, as illustrated in Table I the primary frequency is also the secondary frequency. However, one of ordinary skills in the art understands that this is for tutorial purposes only, and the sector may comprise another frequency with the same channel assignments as frequency $f_1$ designated as a secondary frequency. The sector further transmits a F-PCH on the forward link on the frequency $f_2$. The subscriber station operating in accordance with both IS-95 and IS-2000 standards can process the F-SYNC and the F-PCH; consequently, the frequencies $f_1$ and $f_2$ can support both types of the subscriber stations. The sector transmits a Broadcast Control Channel (F-BCCH) and a Common Control Channel (F-CCCH) on the forward link on frequencies $f_3$ and $f_4$. Because the F-BCCH and the F-CCCH replaced the F-PCH for P_REV 7 subscriber stations, the frequencies $f_3$ and $f_4$ can support only the P_REV 7 or higher protocol revision subscriber stations. Note that forward pilot channel and other forward channels transmitted by the sector are not illustrated for the sake of simplicity.

Referring back to FIG. 1, and accompanying text for reference, all subscriber stations read the primary frequency $f_1$ from its memory or from the roaming lists held within its memory and acquire the forward pilot channel on frequency $f_1$. All subscriber stations then acquire the F-SYNC and read the Sync Channel Message. A subscriber's station memory may consist of its physical memory or memory located on an external, but connected device such as a SIM (Subscriber Identification Modulate), also called a UIM (User Identification Module).

The subscriber stations operating in accordance with the IS-2000 standard tune to a frequency provided in the field EXT_CDMA_FREQ, and acquire the F-BCCH and the F-CCCH transmitted on the frequency. Because the F-BCCH and the F-CCCH, which the mobiles can receive, is transmitted on frequencies $f_3$ and $f_4$, the EXT_CDMA_FREQ field contains either frequency $f_3$ or frequency $f_4$. The F-BCCH provides the subscriber stations with an Extended CDMA Channel List Message. The subscriber stations use a hash function to select one of the frequencies contained in the Extended CDMA Channel List Message. The field CDMA_FREQ identifies each of these frequencies in the message. Because the F-BCCH and the F-CCCH, which the mobiles can receive, is transmitted on frequencies $f_3$ and $f_4$, the list of frequencies contains both frequencies $f_3$ and $f_4$. Due to the operation of the hash function, approximately half of the subscriber stations will be directed to frequency $f_3$ (hereinafter hashed to frequency) and the remaining subscriber stations will be hashed to frequency $f_4$. The subscriber stations then acquire the F-BCCH and the F-CCCH transmitted on the respective hashed to frequency $f_3$ and $f_4$.

The subscriber stations operating correctly in accordance with the IS-95 standard read the first portion (202 of FIG. 2) of the Sync Channel Message 200, tune to a frequency provided in the field CDMA_FREQ, and acquire the F-PCH transmitted on the frequency. Because the F-PCH, which the mobiles can receive, is transmitted on frequencies $f_1$ and $f_2$, the CDMA_FREQ field contains either frequencies $f_1$ or $f_2$. The F-PCH provides the subscriber stations with the CDMA Channel List Message and may provide the Extended CDMA Channel List Message. The subscriber stations operating in accordance with the IS-95 standard ignore the Extended CDMA Channel List Message and use a hash function to select one of the frequencies contained in the CDMA_FREQ field of the CDMA Channel List Message. Because the F-PCH, which the mobiles can receive, is transmitted on frequencies $f_1$ and $f_2$, the CDMA_FREQ field contains both frequencies $f_1$ and $f_2$. Due to the operation of the hash function, the subscriber stations will be approximately evenly distributed among frequencies $f_1$ and $f_2$. The subscriber stations then acquire the F-PCH transmitted on the respective hashed to frequency $f_1$ and $f_2$.

The subscriber stations operating in accordance with the IS-95 standard, but containing the above-mentioned flaw, read the Sync Channel Message past the first portion (202 of FIG. 2) and cease to operate properly.

SUMMARY OF THE INVENTION

In one aspect of the present invention, an access network built in accordance with an IS-2000 standard modulates a message on a first synchronization channel transmitted on at least one first frequency from at least one sector; and modulates the modified message on a second synchronization channel transmitted on at least one second frequency from the at least one sector. The subscriber station is assigned a primary frequency in accordance with a standard with which the subscriber station is capable of operating. The subscriber station is assigned the first frequency as a primary frequency if the subscriber station operates in accordance with an IS-95 standard; and the second frequency as a primary frequency if the subscriber station operates in accordance with the IS-2000 standard In another aspect of the present invention, an access network built in accordance with the IS-2000 standard transmits a synchronization channel modulated by a modified first message and a paging channel from a sector on at least one first frequency; and a broadcast control channel and a common control channel from the sector on at least one second frequency. The subscriber stations are assigned the first frequency as a primary frequency, and those subscriber stations capable of utilizing the broadcast control channel and the common control channel are redirected from the at least first frequency to the at least second frequency by a Service Redirection Message modulating the paging channel.

In another aspect of the present invention, an access network built in accordance with the IS-2000 standard transmits a synchronization channel modulated by a modified first message; and a paging channel from a sector on at least one first frequency, and a broadcast control channel and a common control channel from the sector on at least one second frequency. The subscriber stations are assigned the first frequency as a primary frequency, and those subscriber stations capable of utilizing the broadcast control channel and the common control channel are directed to the at least second frequency by operation of the Extended CDMA Channel List Message modulating the paging channel.

In another aspect of the present invention, an access network built in accordance with the IS-2000 standard transmits a synchronization channel modulated by a modified first message and a paging channel from a sector on at least one first frequency, and a broadcast control channel and a common control channel from the sector on at least one second frequency. The subscriber stations are assigned the first frequency as a primary frequency, and those subscriber stations capable of utilizing the broadcast control channel; and the common control channel are directed to the at least second frequency by operation of the Extended Global Service Redirection Message modulating the paging channel.

In another aspect of the present invention, an access network built in accordance with an IS-2000 standard transmits a synchronization channel modulated by a modified first message and a paging channel from a sector on at least one first frequency; a broadcast control channel, a common control channel and a synchronization channel modulated by the first message from the sector on at least one second frequency; and a broadcast control channel and a common control channel from the sector on at least one third frequency. The subscriber stations are assigned the first frequency as a primary frequency, and those subscriber stations capable decoding a Extended CDMA Channel List Message modulating the paging channel are directed to the at least second frequency by operation of the Extended CDMA Channel List Message. The subscriber stations capable of utilizing the broadcast control channel and the common control channel are directed to the at least third frequency by operation of an Extended System Parameters Message modulating the synchronization channel transmitted by the sector on the at least second frequency.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Definitions

Figure 1:
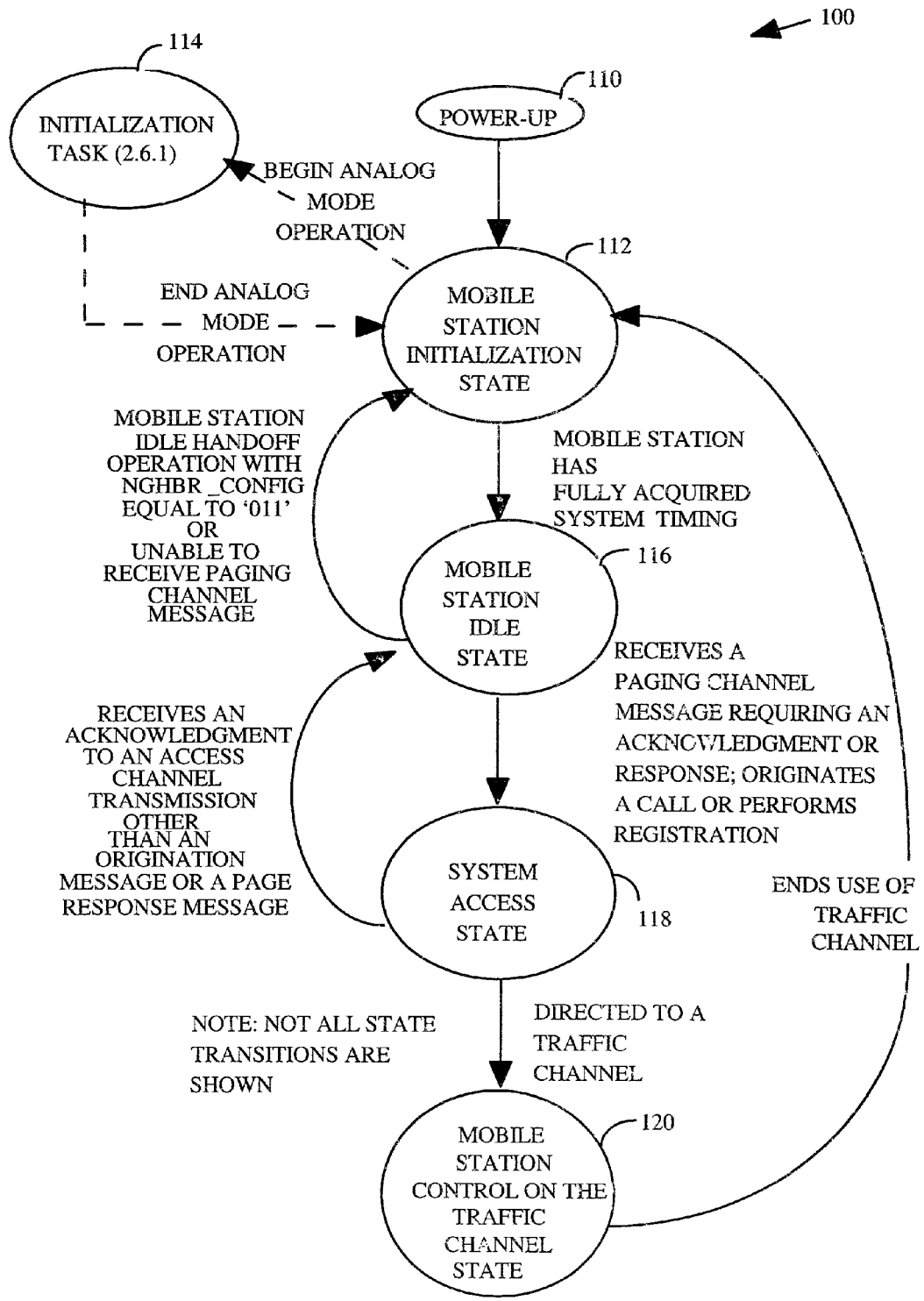
FIG. 1 illustrates an example of a state machine embodying a subscriber station call processing.

The word "exemplary" is used exclusively herein to mean "serving as an example, instance, or illustration." Any embodiment described herein as "exemplary" is not necessarily to be construed as preferred or advantageous over other embodiments.

The term access network is used exclusively herein to mean a collection of base stations and one or more base station controllers. The access network transports data between multiple subscriber stations. The access network may be further connected to additional networks outside the access network.

The term base station is used exclusively herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station is used exclusively herein to mean the hardware with which an access network communicates. A subscriber station may be mobile or stationary. A subscriber station may be any data device that communicates through a wireless channel or through a wired channel, for example using fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a subscriber station is said to be in a connection setup state. A subscriber station that has established an active traffic channel connection with a base station is called an active subscriber station, and is said to be in a traffic state.

The term communication channel/link is used exclusively herein to mean a single route over which a signal is transmitted described in terms of modulation characteristics and coding, or a single route within the protocol layers of either the base station or the subscriber station.

The term reverse channel/link is used exclusively herein to mean a communication channel/link through which the subscriber station sends signals to the base station.

The term forward channel/link is used exclusively herein to mean a communication channel/link through which a base station sends signals to a subscriber station.

The term registration is used exclusively herein to mean a process by which a subscriber station identifies its location and provides parameters to a base station.

The term active set is used exclusively herein to mean a set of pilot signals associated with the CDMA channels containing Forward Traffic Channel assigned to a particular base station.

The term soft hand-off is used exclusively herein to mean a communication between a subscriber station and two or more sectors, wherein each sector belongs to a different cell. In the context of IS-95 standard, the reverse link communication is received by both sectors, and the forward link communication is simultaneously carried on the two or more sectors' forward links.

The term softer hand-off is used exclusively herein to mean a communication between a subscriber station and two or more sectors, wherein each sector belongs to the same cell. In the context of the IS-95 standard, the reverse link communication is received by both sectors, and the forward link communication is simultaneously carried on one of the two or more sectors' forward links.

Description

To prevent the above-described failure of subscriber stations operating in a communication systems comprising sectors capable of supporting communication with subscriber stations operating in accordance with both IS-95 and IS-2000 standards, several embodiments are described.

One embodiment of the present invention will be explained in reference to an exemplary frequency and channel assignment for a sector capable of supporting communication with subscriber stations operating in accordance to both IS-95 and IS-2000 standards as illustrated in Table II.

TABLE II

| FREQUENCY | CHANNEL |
|---|---|
| f1 | Synchronization channel (F-SYNC$_m$) |
|  | Paging channel (F-PCH) |
| f2 | Paging channel (F-PCH) |
| f3 | Broadcast Control Channel (F-BCCH) |
|  | Common Control Channel (F-CCCH) |
|  | Synchronization channel (F-SYNC) |
| f4 | Broadcast Control Channel (F-BCCH) |
|  | Common Control Channel (F-CCCH) |

Figure 2:
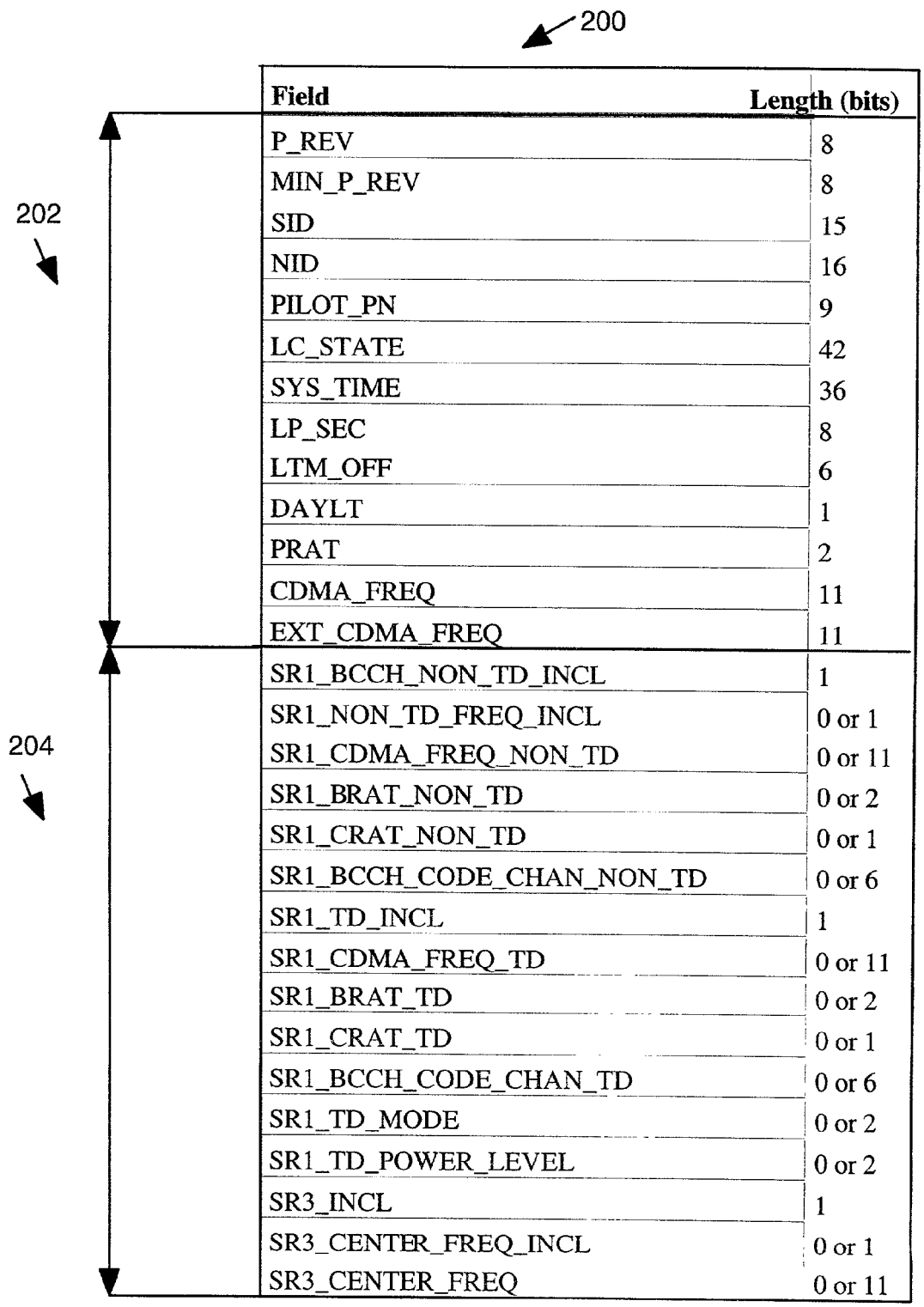
FIG. 2 illustrates an example of a Sync Channel Message.

The sector transmits a modified Sync Channel Message on a Synchronization Channel (F-SYNC$_m$) and a F-PCH on the forward link on the primary frequency $f_1$. The abbreviation F-SYNC$_m$ is used to indicate that the Synchronization Channel is modulated with the modified Sync Channel Message. The modified Sync Channel Message comprises only the first portion (202 of FIG. 2) of the Sync Channel Message. For the sake of simplicity, as illustrated in Table II the primary frequency is also the secondary frequency. However, one of ordinary skills in the art understands that this is for tutorial purposes only, and the sector may comprise another frequency with the same channel assignment as frequency $f_1$ designated as a secondary frequency. The sector further transmits an F-PCH on the forward link on the frequency $f_2$. The subscriber station operating in accordance with both IS-95 and IS-2000 standards can process the F-SYNC and the F-PCH; consequently, the frequencies $f_1$ and $f_2$ can support both types of the subscriber stations. The sector transmits an F-BCCH and an F-CCCH on the forward link on frequencies $f_3$ and $f_4$. Because the F-BCCH and the F-CCCH replaced the F-PCH for P_REV 7 and higher protocol revision subscriber stations, the frequencies $f_3$ and $f_4$ can support only the P_REV 7 and higher protocol revision subscriber stations. Additionally, the sector transmits a (non-modified) Synchronization Channel (F-SYNC) on the forward link on frequency $f_3$, frequency $f_4$, or both frequency $f_3$ and $f_4$. For the sake of simplicity the F-SYNC is shown only on the forward link on the frequency $f_3$.

The subscriber stations operating in accordance with the IS-95 standard have the frequency $f_1$ on the roaming lists as a primary frequency; the subscriber stations operating in accordance with the IS-2000 standard have the frequency $f_3$ on the roaming lists as a primary frequency.

Referring back to FIG. 1, and accompanying text for reference, the subscriber stations operating in accordance with the IS-95 standard will read the primary frequency $f_1$ from the roaming lists and acquire the forward pilot channel on frequency $f_1$. The subscriber stations then acquire the F-SYNC$_m$ and read the Sync Channel Message. Because the F-SYNC$_m$ comprises only the first portion (202 of FIG. 2) of the Sync Channel Message, all subscriber stations correctly read the Sync Channel Message, tune to a frequency provided in the field CDMA_FREQ, and acquire the F-PCH transmitted on the frequency. Because the F-PCH, which the mobiles can receive, is transmitted on frequencies $f_1$ and $f_2$, the CDMA_FREQ field contains either frequency $f_1$ or frequency $f_2$. The F-PCH provides the subscriber stations with the CDMA Channel List Message and may provide the Extended CDMA Channel List Message. The IS-95 subscriber stations ignore the Extended CDMA Channel List Message and use a hash function to select one of the frequencies contained in the CDMA_FREQ fields of the CDMA Channel List Message. Because the F-PCH which the mobiles can receive, is transmitted on frequencies $f_1$ and $f_2$, the CDMA_FREQ fields in the CDMA Channel List Messages (one of which is sent on each of frequencies $f_1$ and $f_2$) contain both frequencies $f_1$ and $f_2$. Due to the operation of the hash function, the subscriber stations will be approximately evenly distributed among frequencies $f_1$ and $f_2$. The subscriber stations then acquire the F-PCH transmitted on the respective hashed to frequency $f_1$ or $f_2$.

The subscriber stations operating in accordance with the IS-2000 standard read the primary frequency $f_3$ from the roaming lists and acquire the forward pilot channel on frequency $f_3$. The subscriber stations then acquire the F-SYNC, read the Sync Channel Message, tune to a frequency provided in the field EXT_CDMA_FREQ, and acquire the F-BCCH and the F-CCCH transmitted on the frequency. Because the F-BCCH and the F-CCCH, which the mobiles can receive, is transmitted on frequencies $f_3$ and $f_4$, the EXT_CDMA_FREQ field contains either frequencies $f_3$ or $f_4$. The F-BCCH provides the subscriber stations an Extended CDMA Channel List Message. The subscriber stations use a hash function to select one of the frequencies contained in the CDMA_FREQ field of the Extended CDMA Channel List Message. Because the F-BCCH and the F-CCCH, which the mobiles can receive, are transmitted on frequencies $f_3$ and $f_4$, the CDMA_FREQ field contains both frequencies $f_3$ and $f_4$. Due to the operation of the hash function, the subscriber stations are approximately evenly distributed among the frequencies $f_3$ and $f_4$. The subscriber stations then acquire the F-BCCH and the F-CCCH transmitted on the respective hashed to frequency $f_3$ and $f_4$.

Another embodiment of the present invention will be explained in reference to an exemplary frequency and channel assignment for a sector capable of supporting communication with subscriber stations operating in accordance to both IS-95 and IS-2000 standards as illustrated in Table III.

TABLE III

| FREQUENCY | CHANNEL |
| --- | --- |
| f1 | Synchronization channel (F-SYNC$_m$) |
|  | Paging channel (F-PCH) |
| f2 | Paging channel (F-PCH) |
| f3 | Broadcast Control Channel (F-BCCH) |
|  | Common Control Channel (F-CCCH) |
|  | Synchronization channel (F-SYNC) |
| f4 | Broadcast Control Channel (F-BCCH) |
|  | Common Control Channel (F-CCCH) |

In accordance with this embodiment, no modification to the subscriber stations' roaming lists is necessary; therefore, all subscriber stations have $f_1$ as a primary and, for tutorial purposes, secondary frequency on the roaming lists.

The sector transmits a modified Sync Channel Message on a Synchronization Channel (F-SYNC$_m$) and a F-PCH on the forward link on the primary frequency $f_1$. The abbreviation F-SYNC$_m$ is used to indicate that the Synchronization Channel is modulated with the modified Sync Channel Message. The modified Sync Channel Message comprises only the first portion (202 of FIG. 2) of the Sync Channel Message. For the sake of simplicity, as illustrated in Table III the primary frequency is also the secondary frequency. However, one of ordinary skills in the art understands that this is for tutorial purposes only, and the sector may comprise another frequency with the same channel assignment as frequency $f_1$ designated as a secondary frequency. The sector further transmits an F-PCH on the forward link on the frequency $f_2$. The subscriber station operating in accordance with both IS-95 and IS-2000 standards can process the F-SYNC and the F-PCH; consequently, the frequencies $f_1$ and $f_2$ can support both types of the subscriber stations. The sector transmits an F-BCCH and an F-CCCH on the forward link on frequencies $f_3$ and $f_4$. Because the F-BCCH and the F-CCCH replaced the F-PCH for P_REV 7 subscriber stations, the frequencies $f_3$ and $f_4$ can support only the P_REV 7 and higher protocol revision subscriber stations. Additionally, the sector transmits a (non-modified) Synchronization Channel (F-SYNC) on the forward link on frequency $f_3$, frequency $f_4$. or both frequency $f_3$ and $f_4$. For the sake of simplicity, the F-SYNC is shown only on the forward link on the frequency $f_3$.

Referring back to FIG. 1, and accompanying text for reference, all the subscriber stations read the primary frequency $f_1$ from the roaming lists and acquire the forward pilot channel on frequency $f_1$. The subscriber stations then acquire the F-SYNC$_m$ and read the Sync Channel Message. Because the F-SYNC$_m$ comprises only the first portion (202 of FIG. 2) of the Sync Channel Message all the subscriber stations correctly read the Sync Channel Message, and tune to a frequency provided in the field CDMA_FREQ. Because the F-PCH, which all the mobiles can receive, is transmitted on frequencies $f_1$ and $f_2$, the CDMA_FREQ field can contain either $f_1$ and $f_2$. All the subscriber stations then acquire the F-PCH transmitted on the respective frequency $f_1$ and $f_2$. Upon acquiring the F-PCH, the subscriber stations register with the sector. As part of the registration process, the subscriber station reports a P_REV number.

Upon receiving the P_REV number, the sector uses a Service Redirection Message sent on the F-PCH to individually address each P_REV 7 and higher protocol revision subscriber stations. The Service Redirection Message contains information, directing a subscriber station to tune to a particular frequency. Because the F-SYNC is transmitted on frequency $f_3$, the P_REV 7 subscriber stations are redirected to frequency $f_3$. The P_REV 7 subscriber stations acquire the F-SYNC on the frequency $f_3$, read the Sync Channel Message, and tune to a frequency provided in the field EXT_CDMA_FREQ. Because the F-BCCH and the F-CCCH, which the P_REV 7 and higher protocol revision subscriber stations can receive, is transmitted on frequencies $f_3$ and $f_4$, the EXT_CDMA_FREQ field may contain either frequency $f_3$ or $f_4$. The P_REV 7 subscriber stations then acquire the F-BCCH and the F-CCCH transmitted on the frequency specified in the EXT_CDMA_FREQ field. The F-BCCH provides the subscriber stations with the Extended CDMA Channel List Message. The subscriber stations use a hash function to select one of the frequencies contained in the CDMA_FREQ field of the Extended CDMA Channel List Message. Because the F-BCCH and the F-CCCH, which the mobiles can receive, is transmitted on frequencies $f_3$ and $f_4$, the CDMA_FREQ fields contains both frequencies $f_3$ and $f_4$. Due to the operation of the hash function, the subscriber stations are approximately evenly distributed among the frequencies $f_3$ and $f_4$. The subscriber stations then acquire the F-BCCH and the F-CCCH transmitted on the respective hashed to $f_3$ and $f_4$.

The P_REV 5 and P_REV 6 subscriber stations receive the CDMA Channel List Message and use a hash function to select one of the frequencies contained in the CDMA_FREQ fields. Because the F-PCH, which the P_REV 5 and P_REV 6 subscriber stations can receive, is transmitted on frequencies $f_1$ and $f_2$, the CDMA_FREQ fields contains both frequencies $f_1$ and $f_2$. Due to the operation of the hash function, the P_REV 5 and P_REV 6 subscriber stations are approximately evenly distributed among the frequencies $f_1$ and $f_2$. The P_REV 5 and P_REV 6 subscriber stations then acquire the F-PCH transmitted on the respective hashed to frequency $f_1$ or $f_2$.

Another embodiment of the present invention will be explained in reference to an exemplary frequency and channel assignment for a sector supporting communication with subscriber stations operating in accordance to both IS-95 and IS-2000 standards as illustrated in Table IV.

TABLE IV

| FREQUENCY | CHANNEL |
| --- | --- |
| f1 | Synchronization channel (F-SYNC$_m$) |
|  | Paging channel (F-PCH) |
| f2 | Synchronization channel (F-SYNC) |
|  | Paging channel (F-PCH) |
| f3 | Synchronization channel (F-SYNC) |
|  | Paging channel (F-PCH) |
| f4 | Broadcast Control Channel (F-BCCH) |
|  | Common Control Channel (F-CCCH) |
|  | Synchronization channel (F-SYNC) |
| f5 | Broadcast Control Channel (F-BCCH) |
|  | Common Control Channel (F-CCCH) |

In accordance with this embodiment, no modification to the subscriber stations' roaming lists is necessary; therefore, all subscriber stations have $f_1$ as a primary and, for tutorial purposes, secondary frequency on the roaming lists.

The sector transmits a modified Sync Channel Message on a Synchronization Channel (F-SYNC$_m$) and a F-PCH on the forward link on the primary frequency $f_1$. The abbreviation F-SYNC$_m$ is used to indicate that the Synchronization Channel is modulated with the modified Sync Channel Message. The modified Sync Channel Message comprises only the first portion (202 of FIG. 2) of the Sync Channel Message. For the sake of simplicity, as illustrated in Table IV the primary frequency is also the secondary frequency. However, one of ordinary skills in the art understands that this is for tutorial purposes only, and the sector may comprise another frequency with the same channel assignment as frequency $f_1$ designated as a secondary frequency. The sector further transmits a (non-modified) F-SYNC and a F-PCH on the forward link on the frequencies $f_2$ and $f_3$. The subscriber station operating in accordance with both IS-95 and IS-2000 standards can process the F-SYNC$_m$ and the F-PCH; consequently, the frequencies $f_1$, $f_2$ and $f_3$ can support both types of the subscriber stations. The sector further transmits an F-BCCH and an F-CCCH on the forward link on frequencies $f_4$ and $f_5$. Because the F-BCCH and the F-CCCH replaced the F-PCH for P_REV 7 subscriber stations, the frequencies $f_4$ and $f_5$ can support only the P_REV 7 subscriber stations. Additionally, the sector transmits a (non-modified) F-SYNC on the forward link on frequency $f_4$, frequency $f_5$ or both frequency $f_4$ and $f_5$. For the sake of simplicity the F-SYNC is shown only on the forward link on the frequency $f_4$.

Referring back to FIG. 1, and accompanying text for reference, all the subscriber stations read the primary frequency $f_1$ from the roaming lists and acquire the forward pilot channel on frequency $f_1$. All the subscriber stations then acquire the F-SYNC$_m$ and read the Sync Channel Message. Because the F-SYNC$_m$ comprises only the first portion (202 of FIG. 2) of the Sync Channel Message all subscriber stations correctly read the Sync Channel Message, and tune to a frequency provided in the field CDMA_FREQ. Because the F-PCH, which all the mobiles can receive, is transmitted on frequencies $f_1$, $f_2$ and $f_3$, the CDMA_FREQ field can contain frequency $f_1$ or $f_2$ or $f_3$. All the subscriber stations then acquire the F-PCH on the respective frequency $f_1$ or $f_2$ or $f_3$. The F-PCH provides the CDMA Channel List Message and additionally an Extended CDMA Channel List Message.

The P_REV 5 subscriber stations receive the CDMA Channel List Message and the Extended CDMA Channel List Message. The subscriber stations ignore the Extended CDMA Channel List Message and use a hash function to select one of the frequencies contained in the CDMA_FREQ field of the CDMA Channel List Message. Because the F-PCH, which the mobiles can receive, is transmitted on frequencies $f_1$, $f_2$, and $f_3$ the CDMA_FREQ field contains frequencies $f_1$, $f_2$, and $f_3$. Due to the operation of the hash function, the P_REV 5 subscriber stations are evenly distributed among frequencies $f_1$, $f_2$, and $f_3$. The P_REV 5 subscriber stations then acquire the F-PCH transmitted on the respective hashed to frequency $f_1$ or $f_2$ or $f_3$.

The P_REV 6 and P_REV 7 subscriber stations receive both the CDMA Channel List Message and the Extended CDMA Channel List Message, however, the P_REV 6 and P_REV 7 subscriber stations disregard the CDMA Channel List Message, and use the frequencies listed in the field CDMA_FREQ of the Extended CDMA Channel List Message as an input to the hashing function. Because the exemplary frequency and channel assignment transmits F-PCH and non-modified F-SYNC on frequencies $f_2$ and $f_3$ the field CDMA_FREQ may contain frequency $f_2$ and $f_3$. Due to the operation of the hash function, the P_REV 6 and P_REV 7 subscriber stations are evenly distributed among frequency $f_2$ and frequency $f_3$. The P_REV 6 subscriber stations then acquire F-PCH at the respective hashed to frequency $f_2$ and $f_3$.

The P_REV 7 subscriber stations are programmed to attempt to acquire a non-modified F-SYNC on the respective hashed to frequency $f_2$ and $f_3$. If the attempt is successful, the P_REV 7 subscriber stations acquire the F-SYNC on the respective hashed to frequency $f_2$ and $f_3$, read the Sync Channel Message, and tune to a frequency provided in the field EXT_CDMA_FREQ. Because the F-BCCH and the F-CCCH, which the P_REV 7 subscriber station can receive, is transmitted on frequencies $f_4$ and $f_5$, the EXT_CDMA_FREQ field may contain either frequency $f_4$ or $f_5$. The P_REV 7 subscriber stations then acquire the F-BCCH and the F-CCCH transmitted on the frequency specified in the EXT_CDMA_FREQ field. The F-BCCH provides the subscriber stations with the Extended CDMA Channel List Message. The subscriber stations read the Extended CDMA Channel List Message and use the CDMA_FREQ field as an input to the hash function. Because the F-BCCH and F-CCCH are transmitted on $f_4$ and $f_5$, the CDMA_FREQ field contains both $f_4$ and $f_5$. Due to the operation of the hash function, the P_REV 7 subscriber stations P_REV 7 subscriber stations are evenly distributed among frequency $f_4$ and frequency $f_5$. The P_REV 7 subscriber stations then acquire the F-BCCH and the F-CCCH at the respective hashed to frequency $f_4$ and $f_5$.

One embodiment of the present invention will be explained in reference to an exemplary frequency and channel assignment for a sector capable of supporting communication with subscriber stations operating in accordance to both IS-95 and IS-2000 standards as illustrated in Table V.

TABLE V

| FREQUENCY | CHANNEL |
| --- | --- |
| f1 | Synchronization channel (F-SYNC$_m$) Paging channel (F-PCH) |
| f2 | Paging channel (F-PCH) |
| f3 | Broadcast Control Channel (F-BCCH) Common Control Channel (F-CCCH) |
| f4 | Broadcast Control Channel (F-BCCH) Common Control Channel (F-CCCH) |

In accordance with this embodiment, no modification to the subscriber stations' roaming lists is necessary; therefore, all subscriber stations have $f_1$ as a primary and, for tutorial purposes, secondary frequency on the roaming lists.

The sector transmits a modified Sync Channel Message on a Synchronization Channel (F-SYNC$_m$) and a F-PCH on the forward link on the primary frequency $f_1$. The abbreviation F-SYNC$_m$ is used to indicate that the Synchronization Channel is modulated with the modified Sync Channel Message. The modified Sync Channel Message comprises only the first portion (202 of FIG. 2) of the Sync Channel Message. For the sake of simplicity, as illustrated in Table V the primary frequency is also the secondary frequency. However, one of ordinary skills in the art understands that this is for tutorial purposes only, and the sector may comprise another frequency with the same channel assignment as frequency $f_1$ designated as a secondary frequency. The sector further transmits a F-PCH on the forward link on the frequency $f_2$. The subscriber station operating in accordance with both IS-95 and IS-2000 standards can process the F-SYNC$_m$ and the F-PCH; consequently, the frequencies $f_1$ and $f_2$ can support both types of the subscriber stations. The sector transmits a Broadcast Control Channel (F-BCCH) and a Common Control Channel (F-CCCH) on the forward link on frequencies $f_3$ and $f_4$. Because the F-BCCH and the F-CCCH replaced the F-PCH for P_REV 7 subscriber stations, the frequencies $f_3$ and $f_4$ can support only the P_REV 7 subscriber stations. Note that forward pilot channel and other forward channels transmitted by the sector are not illustrated for the sake of simplicity.

Referring back to FIG. 1, and accompanying text for reference, all the subscriber stations read the primary frequency $f_1$ from the roaming lists and acquire the forward pilot channel on frequency $f_1$. The subscriber stations then acquire the F-SYNC$_m$ and read the Sync Channel Message. Because the F-SYNC$_m$ comprises only the first portion (202 of FIG. 2) of the Sync Channel Message all the subscriber stations correctly read the Sync Channel Message, and tune to a frequency provided in the field CDMA_FREQ. Because the F-PCH, which all the mobiles can receive, is transmitted on frequencies $f_1$ and $f_2$, the CDMA_FREQ field can contain either $f_1$ and $f_2$. All the subscriber stations then acquire the F-PCH transmitted on the respective frequency $f_1$ and $f_2$, and receive the CDMA Channel List Message and the Extended CDMA Channel List Message and an Extended Global Service Redirection Message.

The Extended Global Service Redirection Message has a redirection range of P_REVs in the form of fields REDIRECT_P_MAX and REDIRECT_P_MIN. Subscriber stations with such P_REVs will be redirected. In accordance with the present embodiment, REDIRECT_P_MIN would be set to 7 and REDIRECT_P_MAX would be set to 7 or a higher number. Consequently, the P_REV 7 subscriber stations will be redirected to a frequency identified by the CDMA_CHAN field. Because the frequencies supporting the F-BCCH, F-CCCH, are $f_3$ and $f_4$, the CDMA_CHAN field can comprise either $f_3$ or $f_4$.

The P_REV 5 subscriber stations ignore the Extended CDMA Channel List Message and use a hash function to select one of the frequencies contained in the CDMA_FREQ fields of the CDMA Channel List Message. Because the F-PCH, which the mobiles can receive, is transmitted on frequencies $f_1$ and $f_2$, the CDMA_FREQ fields contains both frequencies $f_1$ and $f_2$. Due to the operation of the hash function, the subscriber stations will be approximately evenly distributed among frequencies $f_1$ and $f_2$. The subscriber stations then acquire the F-PCH transmitted on the respective hashed to frequency $f_1$ or $f_2$.

The P_REV 6 subscriber stations disregard the CDMA Channel List Message, and use the frequencies listed in the field CDMA_FREQ of the Extended CDMA Channel List Message as an input to the hashing function. Because the exemplary frequency and channel assignment transmits F-PCH and non-modified F-SYNC on frequencies $f_1$ and $f_2$ the field CDMA_FREQ may contain frequency $f_1$ and $f_2$. Due to the operation of the hash function, the P_REV 6 subscriber stations are evenly distributed among frequency $f_1$ and frequency $f_2$. The P_REV 6 subscriber stations then acquire F-PCH at the respective hashed to frequency $f_1$ and $f_2$.

One embodiment of the present invention will be explained in reference to an exemplary frequency and channel assignment for a sector capable of supporting communication with subscriber stations operating in accordance to both IS-95 and IS-2000 standards as illustrated in Table VI.

| FREQUENCY | CHANNEL |
| --- | --- |
| f1 | Synchronization channel (F-SYNC$_m$) Paging channel (F-PCH) |
| f2 | Paging channel (F-PCH) |
| f3 | Broadcast Control Channel (F-BCCH) Common Control Channel (F-CCCH) Paging channel (F-PCH) Synchronization channel (F-SYNC) |
| f4 | Broadcast Control Channel (F-BCCH) Common Control Channel (F-CCCH) |

In accordance with this embodiment, no modification to the subscriber stations' roaming lists is necessary; therefore, all subscriber stations have $f_1$ as a primary and, for tutorial purposes, secondary frequency on the roaming lists.

The sector transmits a modified Sync Channel Message on a Synchronization Channel (F-SYNC$_m$) and a F-PCH on the forward link on the primary frequency $f_1$. The abbreviation F-SYNC$_m$ is used to indicate that the Synchronization Channel is modulated with the modified Sync Channel Message. The modified Sync Channel Message comprises only the first portion (202 of FIG. 2) of the Sync Channel Message. For the sake of simplicity, as illustrated in Table V the primary frequency is also the secondary frequency. However, one of ordinary skills in the art understands that this is for tutorial purposes only, and the sector may comprise another frequency with the same channel assignment as frequency $f_1$ designated as a secondary frequency. The sector further transmits an F-PCH on the forward link on the frequency $f_2$ and frequency $f_3$. The subscriber station operating in accordance with both IS-95 and IS-2000 standards can process the F-SYNC and the F-PCH; consequently, the frequencies $f_1$, $f_2$, and $f_3$ can support both types of the subscriber stations. The sector transmits an F-BCCH and an F-CCCH on the forward link on frequencies $f_3$ and $f_4$. Because the F-BCCH and the F-CCCH replaced the F-PCH for P_REV 7 subscriber stations, the frequencies $f_3$ and $f_4$ can support the P_REV 7 subscriber stations. Additionally, the sector transmits a (non-modified) Synchronization Channel (F-SYNC) on the forward link on frequency $f_3$, frequency $f_4$, or both frequency $f_3$ and $f_4$. For the sake of simplicity the F-SYNC is shown only on the forward link on the frequency $f_3$.

Referring back to FIG. 1, and accompanying text for reference, all the subscriber stations read the primary frequency $f_1$ from the roaming lists and acquire the forward pilot channel on frequency $f_1$. All the subscriber stations then acquire the F-SYNC$_m$ and read the Sync Channel Message. Because the F-SYNC$_m$ comprises only the first portion (202 of FIG. 2) of the Sync Channel Message all subscriber stations correctly read the Sync Channel Message, and tune to a frequency provided in the field CDMA_FREQ. Because the F-PCH, which all the mobiles can receive, is transmitted on frequencies $f_1$, $f_2$ and $f_3$, the CDMA_FREQ field can contain frequency $f_1$ or $f_2$ or $f_3$. All the subscriber stations then acquire the F-PCH on the respective frequency $f_1$ or $f_2$ or $f_3$. All the subscriber stations then acquire the F-PCH. The F-PCH provides the CDMA Channel List Message and additionally the Extended CDMA Channel List Message as described above.

The P_REV 5 subscriber stations receive the CDMA Channel List Message and the Extended CDMA Channel List Message. The subscriber stations ignore the Extended CDMA Channel List Message and use a hash function to select one of the frequencies contained in the CDMA_FREQ field of the CDMA Channel List Message. Because the F-PCH, which the mobiles can receive, is transmitted on frequencies $f_1$, $f_2$, and $f_3$ the CDMA_FREQ field contains frequencies $f_1$, $f_2$, and $f_3$. Due to the operation of the hash function, the P_REV 5 subscriber stations are evenly distributed among frequencies $f_1$, $f_2$, and $f_3$. The P_REV 5 subscriber stations then acquire the F-PCH transmitted on the respective hashed to frequency $f_1$ or $f_2$ or $f_3$.

The P_REV 6 and P_REV 7 subscriber stations receive both the CDMA Channel List Message and the Extended CDMA Channel List Message, however, the P_REV 6 and P_REV 7 subscriber stations disregard the CDMA Channel List Message, and use the frequencies listed in the field CDMA_FREQ of the Extended CDMA Channel List Message as an input to the hashing function. Because the exemplary frequency and channel assignment of Table VI transmits F-PCH and non-modified F-SYNC on frequencies $f_3$ the field CDMA_FREQ contains frequency $f_3$. The P_REV 6 and P_REV 7 subscriber stations then acquire F-PCH. The F-PCH contains an Extended System Parameters Message containing a field BCCH_SUPPORTED. The field BCCH_SUPPORTED is set to "1", consequently, the P_REV 7 subscriber stations acquire an F-SYNC channel at the frequency $f_3$, read the Sync Channel Message, and tune to a frequency provided in the field EXT_CDMA_FREQ. Because the F-BCCH and the F-CCCH, which the P_REV 7 subscriber station can receive, is transmitted on frequencies $f_3$ and $f_4$, the EXT_CDMA_FREQ field may contain either frequency $f_3$ or $f_4$. The P_REV 7 subscriber stations then acquire the F-BCCH and the F-CCCH transmitted on the frequency specified in the EXT_CDMA_FREQ field. The F-BCCH provides the subscriber stations with the Extended CDMA Channel List Message. The subscriber stations read the Extended CDMA Channel List Message and use the CDMA_FREQ field as an input to the hash function. Because the F-BCCH and F-CCCH are transmitted on $f_3$ and $f_4$, the CDMA_FREQ field contains both $f_3$ and $f_4$. Due to the operation of the hash function, approximately half of the P_REV 7 subscriber stations are directed to frequency $f_3$ and half of the P_REV 7 subscriber stations are directed to frequency $f_4$. The P_REV 7 subscriber stations then acquire the F-BCCH and the F-CCCH.

The P_REV 6 subscriber stations ignore the field BCCH_SUPPORTED and thus remain on the F-PCH of frequency $f_3$.

One skilled in the art will appreciate that although the flowchart diagrams are drawn in sequential order for comprehension, certain steps can be carried out in parallel in an actual implementation. Furthermore, unless indicate otherwise, method steps can me interchanged without departing form the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for frequency and channel assignment for sectors in a spread spectrum communications system, the method comprising:
    modulating a message on a first synchronization channel transmitted on at least one first frequency from at least one sector;
    modifying the message to generate a single modified message and beginning with a Protocol Revision (P REV) field, including a CDMA Frequency Assignment (CDMA FREQ) field, and ending with an Extended CDMA Frequency Assignment (EXT CDMA FREQ) field; wherein the CDMA Frequency Assignment (CDMA FREQ) field is immediately before and adjacent to the Extended CDMA Frequency Assignment (EXT CDMA FEQ) field; and
    modulating the modified message on a second synchronization channel transmitted on at least one second frequency from the at least one sector.

2. The method as claimed in claim 1, wherein said modulating a message on a first synchronization channel transmitted on at least one first frequency from the at least one sector comprises:
    modulating a Sync Channel Message on a first synchronization channel transmitted on at least one first frequency from the at least one sector.

3. The method as claimed in claim 1, wherein said modulating the modified message on a second synchronization channel transmitted on at least one second frequency from the at least one sector comprises:
    modulating the modified Sync Channel Message on a second synchronization channel transmitted on at least one second frequency from the at least one sector.

4. The method as claimed in claim 1, wherein said modulating the modified message on a second synchronization channel transmitted on at least one second frequency from the at least one sector comprises:
    deleting at least one field from the message.

5. A method for frequency and channel assignment for sectors in a spread spectrum communications system, the method comprising:
    modulating a message on a first synchronization channel transmitted on at least one first frequency from at least one sector;
    modulating the message to generate a single modified message, the single modified message consisting of:
        a P REV (Protcol Revision) field,
        a MIN P REV field,
        a SID field,
        a NID field,
        a PILOT PN field,
        a LC state field,
        a SYS TIME field,
        a LP SEC field,
        a LTM OFF field,
        a DAYLT field,
        a PRAT field,
        a CDMA FREQ (CDMA Frequency Assignment field, and
        a EXT CDMA FREQ (Extended CDMA Frequency Assignment) field; and
    modulating the single modified message on a second synchronization channel transmitted on at least one second frequency from the at least one sector.

6. The method as claimed in claim 5, wherein:
    the CDMA FREQ field consists of eleven bits; and
    the EXT CDMA FREQ field consists of eleven bits.

7. The method as claimed in claim 5, wherein said modulating the modified message on a second synchronization channel transmitted on at least one second frequency from the at least one sector comprises:
    deleting at least one field, occurring after the EXT CDMA FREQ field, from the message.

8. A method for frequency and channel assignment for sectors in a spread spectrum communications system, the method comprising:
    modulating a message on a first synchronization channel transmitted on at least one first frequency from at least one sector;
    modulating the message to generate a single modified message, the single modified message consisting of:
        a P REV (Protcol Revision) field,
        a MIN P REV field,
        a SID field,
        a NID field,
        a PILOT PN field,
        a LC state field,
        a SYS TIME field,
        a LP SEC field,
        a LTM OFF field,
        a DAYLT field,
        a PRAT field,
        a CDMA FREQ (CDMA Frequency Assignment field, and a EXT CDMA FREQ (Extended CDMA Frequency Assignment) field, wherein the CDMA FREQ is adjacent to the EXT CDMA FREQ field; and
    modulating the single modified message on a second synchronization channel transmitted on at least one second frequency from the at least one sector.

9. The method as claimed in claim 8, wherein:
    the CDMA FREQ field consists of eleven bits; and
    the EXT CDMA FREQ field consists of eleven bits.

10. The method as claimed in claim 8, wherein said modulating the modified message on a second synchronization channel transmitted on at least one second frequency from the at least one sector comprises:
    deleting at least one field, occurring after the EXT CDMA FREQ field, from the message.

* * * * *